United States Patent
Mori

[11] Patent Number: 6,057,957
[45] Date of Patent: *May 2, 2000

[54] OPTOACOUSTIC MODULATOR

[75] Inventor: Tohru Mori, Tokyo, Japan

[73] Assignee: Ando Electric Co., Ltd., Tokyo, Japan

[ * ] Notice: This patent is subject to a terminal disclaimer.

[21] Appl. No.: 09/138,430

[22] Filed: Aug. 24, 1998

[30] Foreign Application Priority Data

Aug. 29, 1997 [JP] Japan ................................ 9-235219

[51] Int. Cl.$^7$ ............................... G02F 1/11; G02F 1/33
[52] U.S. Cl. ......................... 359/285; 359/305; 359/314
[58] Field of Search .................................. 359/285, 305, 359/326, 310, 313, 314

[56] References Cited

U.S. PATENT DOCUMENTS

| | | | |
|---|---|---|---|
| 4,330,178 | 5/1982 | McNaney | 350/358 |
| 4,440,472 | 4/1984 | Cohen | 350/162.12 |
| 5,107,368 | 4/1992 | Noguchi | 359/285 |

FOREIGN PATENT DOCUMENTS

| | | |
|---|---|---|
| 24 53 233 | 5/1976 | Germany . |
| 63-307434 | 12/1988 | Japan . |
| 1-216316 | 8/1989 | Japan . |

*Primary Examiner*—Scott J. Sugarman
*Assistant Examiner*—Suzanne Letendre
*Attorney, Agent, or Firm*—Fish & Richardson P.C.

[57] ABSTRACT

An optoacoustic modulator contains first and second optoacoustic media, to which first and second piezoelectric vibrators are attached respectively. Herein, both of the first and second optoacoustic media are designed in same measurements, wherein they are arranged in series along an optical axis of a light signal in such a way that crystal orientation of the first optoacoustic media differs from crystal orientation of the second optoacoustic media with an angle of inclination of 90°. In addition, the first piezoelectric vibrator is attached to a first surface of the first optoacoustic media which is placed in parallel with the optical axis of the light signal, while the second piezoelectric vibrator is attached to a second surface of the second optoacoustic media which is placed in parallel with the optical axis of the light signal, wherein the first surface is directed perpendicular to the second surface. The light signal, corresponding to incoming light incident on the optoacoustic modulator, is input to the first optoacoustic media. Then, the light signal transmitted through the first optoacoustic media is input to the second optoacoustic media, from which a desired output corresponding to outgoing light is output. The first and second piezoelectric vibrators are controlled by modulation signals, which are independently adjusted to cancel polarization mode dispersions of the optoacoustic media. In addition, it is possible to improve ripple characteristic of loss-wavelength dependency characteristic of the optoacoustic media, while it is possible to reduce an amount of crosstalk that occurs at a high-speed modulation mode.

3 Claims, 5 Drawing Sheets

OPTOACOUSTIC MODULATOR

OPTOACOUSTIC MODULATOR

BACKGROUND OF THE INVENTION

1. Field of the Invention

This invention relates to optoacoustic modulators that are used for optical communications, optical measurements and lasers. This application is based on Patent Application No. Hei 9-235219 filed in Japan, the content of which is incorporated herein by reference.

2. Description of the Related Art

The optoacoustic modulators are one kind of optical modulators, which work as follows:

Modulation signals are applied to piezoelectric elements, which in turn generates ultrasonic waves. Using the ultrasonic waves, refractive indexes of optical media are periodically vibrated, so that modulation is effected on light beams.

FIG. 8 is a block diagram showing an example of a configuration of the optoacoustic modulator. The optoacoustic modulator of FIG. 8 is configured by an input-side optical fiber 51, a lens 52, an oscillator 53, a piezoelectric vibrator 54, a prism 55, a lens 56, an output-side optical fiber 57 and an optoacoustic element 58.

In FIG. 8, the oscillator 53 applies high-frequency signals to the piezoelectric vibrator 54 attached to the optoacoustic element 58, so that periodical variations occur in refractive index of the optoacoustic element 58 due to ultrasonic waves. Thus, diffraction grating is formed.

Incoming beams incident on the input-side optical fiber 51 are converted to parallel beams by the lens 52. These beams are incident on the optoacoustic element 58.

Then, the above beam is subjected to diffraction by the diffraction grating, which is formed inside of the optoacoustic element 8. Thus, it is divided into transmitted beam and primary (or first-order) diffracted beam. The primary diffracted beam is transmitted through the prism 55 and is converged by the lens 56, from which it is output by means of the output-side optical fiber 57.

By turning the high-frequency signals applied to the oscillator 53 on and off, it is possible to activate or cancel formation of the diffraction gating in the optoacoustic element 58. Thus, it is possible to turn on and off the beams which are transmitted between the input-side optical fiber 51 and the output-side optical fiber 57.

Namely, the aforementioned configuration of FIG. 8 actualizes function of the optical switch or optical modulator. Because of such a function, the optoacoustic modulator is widely used in the fields of the measurement devices and the like.

In the case where the aforementioned optoacoustic modulator is used for the measurement device, however, there occurs a problem due to loss-wavelength dependency characteristic of the optoacoustic modulator, wherein loss of the optoacoustic modulator highly depends on wavelength of input light.

FIG. 9 shows an example of the loss-wavelength dependency characteristic of the optoacoustic modulator. By changing the wavelength of the light transmitted through the optoacoustic modulator, it is possible to observe ripple characteristic in loss-wavelength dependency characteristic, for example, which is shown in FIG. 9. Such ripple characteristic is caused by "PMD" (an abbreviation for "Polarization Mode Dispersion") due to birefringence of the optoacoustic element 58.

When the light, which have the PMD while being transmitted through the optoacoustic element 58, is input to the output-side optical fiber 57, interference is caused to occur due to mixing effect in the optical fiber 57. Herein, a degree of interference depends on the wavelength of the light.

So, by changing the wavelength of the light to be transmitted through the optoacoustic modulator, there occurs power variations at an end of the output-side optical fiber, regardless of the constant power of the input light. That is, the ripple characteristic emerges on variations of loss of the optoacoustic modulator.

As described above, if the ripple characteristic exists in the loss-wavelength dependency characteristic of the optoacoustic modulator, the aforementioned problem occurs in the optoacoustic modulator, which is used for the measurement device and the like.

In the aforementioned optoacoustic modulator, only one optoacoustic media is used to diffract light signals input thereto. For this reason, as compared with an amount of crosstalk at a static state, an amount of crosstalk at a high-speed modulation mode is deteriorated remarkably. Such deterioration of the amount of crosstalk causes a problem, which cannot be bypassed by the known usage manners of the optoacoustic modulators.

SUMMARY OF THE INVENTION

It is an object of the invention to provide an optoacoustic modulator which is improved in ripple characteristic of loss-wavelength dependency characteristic and whose amount of crosstalk is reduced at a high-speed modulation mode.

An optoacoustic modulator of this invention is characterized by containing first and second optoacoustic media, to which first and second piezoelectric vibrators are attached respectively. Herein, both of the first and second optoacoustic media are designed in same measurements, wherein they are arranged in series along an optical axis of a light signal in such a way that crystal orientation of the first optoacoustic media differs from crystal orientation of the second optoacoustic media by 90°. In addition, the first piezoelectric vibrator is attached to a first surface of the first optoacoustic media which is placed in parallel with the optical axis of the light signal, while the second piezoelectric vibrator is attached to a second surface of the second optoacoustic media which is also placed in parallel with the optical axis of the light signal, wherein the first surface is directed perpendicular to the second surface.

Now, the light signal, corresponding to incoming light incident on the optoacoustic modulator, is input to the first optoacoustic media. Then, the light signal transmitted through the first optoacoustic media is input to the second optoacoustic media, from which a desired output corresponding to outgoing light is output. The first and second piezoelectric vibrators are controlled by modulation signals, which are produced by an oscillator (or oscillators). The modulation signals supplied to the first and second piezoelectric vibrators are independently adjusted to cancel polarization mode dispersions of the first and second optoacoustic media.

In addition, it is possible to improve ripple characteristic of loss-wavelength dependency characteristic of the optoacoustic media, while it is possible to reduce an amount of crosstalk that occurs at a high-speed modulation mode.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

[A] Embodiment 1

Figure 1:
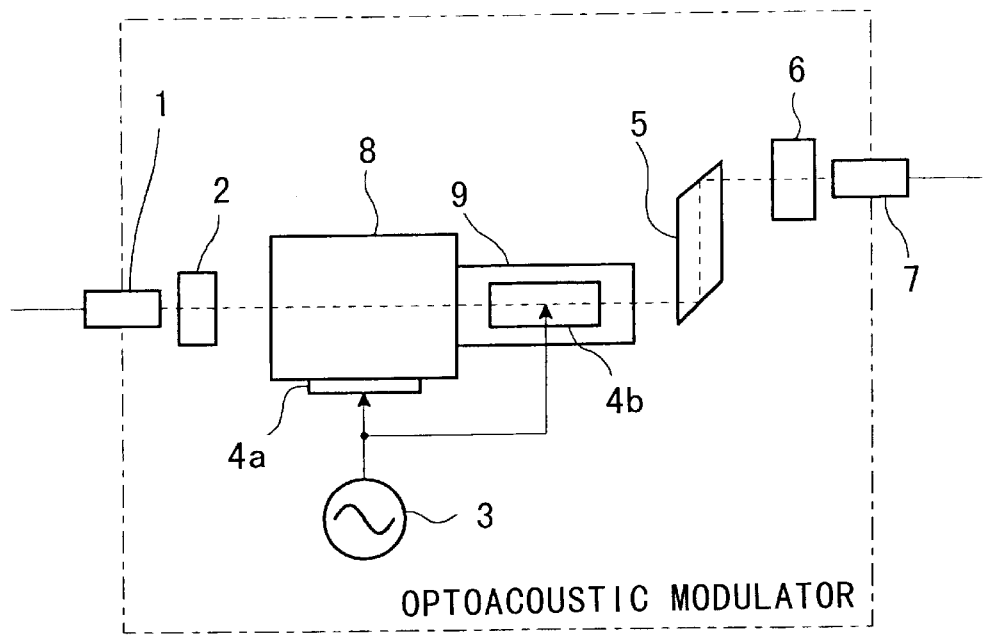
FIG. 1 is a block diagram showing a configuration of an optoacoustic modulator in accordance with embodiment 1 of the invention.

FIG. 1 is a block diagram showing a configuration of an optoacoustic modulator in accordance with embodiment 1 of the invention.

In FIG. 1, an optical fiber 1 supplies the optoacoustic modulator with light signals, while a lens 2 collimates the light signals supplied thereto.

Then, the light signals collimated by the lens 2 are incident on optoacoustic media 8. A piezoelectric vibrator 4a is attached to the optoacoustic media 8. Herein, the piezoelectric vibrator 4a is attached to a selected surface of the optoacoustic media 8, which is directed perpendicular to an incidence surface of the light signals, in other words, which is placed in parallel with an optical axis of the light signals.

An outgoing end of the optoacoustic media 8 is followed by another optoacoustic media 9. The optoacoustic media 8 and 9 are arranged in such a way that their crystal orientations differ from each other with an angle of inclination of 90°. A piezoelectric vibrator 4b is attached to the optoacoustic media 9 as well. Herein, the piezoelectric vibrator 4b is attached to a selected surface of the optoacoustic media 9, which is directed perpendicular to an incidence surface of the light signals, in other words, whose angle of direction differs from that of the foregoing surface of the optoacoustic media 8, to which the piezoelectric vibrator 4a is attached, by 90°.

An oscillator 3 supplies the same modulation signal(s) to both of the piezoelectric vibrator 4a attached to the optoacoustic media 8 and the piezoelectric vibrator 4b attached to the optoacoustic media 9.

In addition, a prism 5 refracts the light signals output from the optoacoustic media 9, while a lens 6 collimates the light signals. Further, an optical fiber 7 outputs the light signals.

Figure 2:
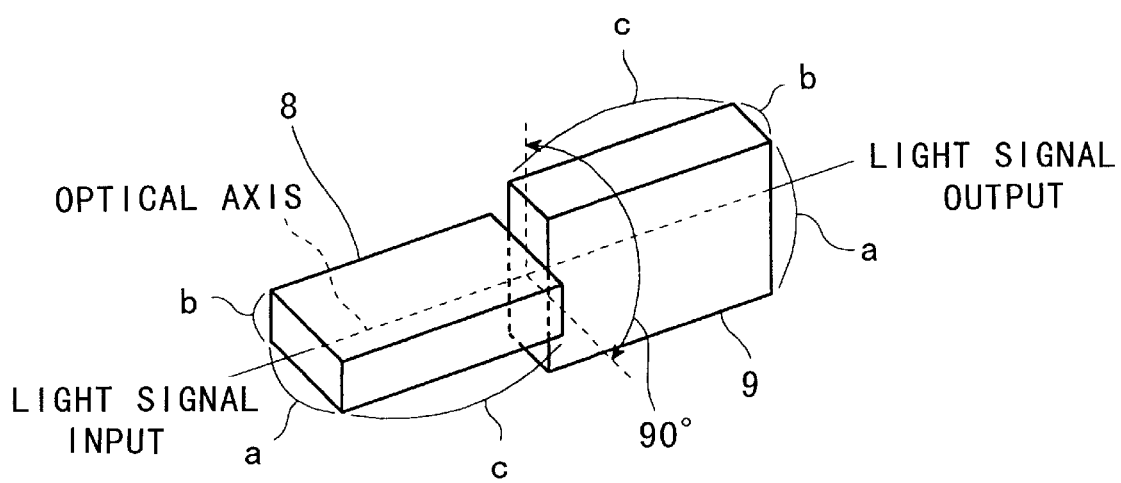
FIG. 2 is a perspective view showing a relationship in arrangements of two optoacoustic media provided in the optoacoustic modulator shown in FIG. 1.

FIG. 2 is a perspective view showing a relationship in arrangements of the optoacoustic media 8 and 9 in detail.

As shown in FIG. 2, the optoacoustic media 8 and 9 are each constructed in rectangular parallelepiped shape and are made of materials having the same physical properties. In addition, each of the optoacoustic media 8 and 9 is formed using different-length sides, which are represented by "a", "b" and "c" respectively.

In the optoacoustic modulator of FIG. 1, the oscillator 3 supplies modulation signals to the piezoelectric vibrators 4a and 4b. Thus, periodical variations occur in refractive indexes of the optoacoustic media 8 and 9 due to ultrasonic waves. Thus, diffraction gating is formed in the optoacoustic media 8 and 9 respectively.

The optical fiber 1 supplies light signals to the optoacoustic modulator, wherein they are collimated by the lens 2 and are then incident on the optoacoustic media 8.

The collimated light signals incident on the optoacoustic media 8 are subjected to the diffraction gating, which is formed inside of the optoacoustic media 8. Thus, the light signal is divided into transmitted light and primary (or first-order) diffracted light. Incidentally, the light signals transmitted through the optoacoustic media 8 are placed under the PMD effect due to birefringence of the optoacoustic media 8.

Then, the light signals output from the optoacoustic media 8 are input to the optoacoustic media 9. As described before, the optoacoustic media 8 and 9 are arranged in such a way that crystal orientations differ from each other with an angle of inclination of 90° about the optical axis.

Therefore, the PMD caused by the optoacoustic media 8 is canceled by birefringence of the optoacoustic media 9.

Like the optoacoustic media 8, the optoacoustic media 9 have diffraction gating, which is formed therein. So, a progressing direction of the light signal is changed to a diffracted direction, which is diffracted by the optoacoustic media 8 and 9. Thus, it is possible to improve the amount of crosstalk of the optoacoustic modulator.

The light signals output from the optoacoustic media 9 are transmitted through the prism 5 and are then converged by the lens 6. Then, the optoacoustic modulator output the converged light by means of the output-side optical fiber 7.

Figure 3:
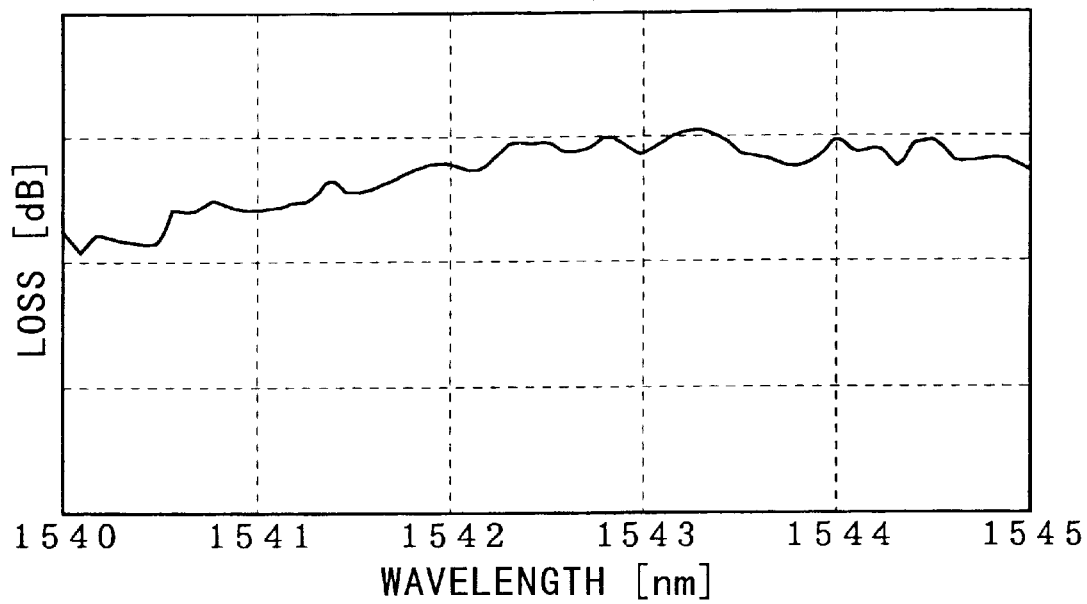
FIG. 3 is a graph showing an example of loss-wavelength characteristic presented by the optoacoustic modulator of FIG. 1.

FIG. 3 shows an example of loss-wavelength characteristic that the present optoacoustic modulator presents. As shown in FIG. 3, the present optoacoustic modulator is capable of suppressing variations in loss due to PMD even if the light signals are varied in wavelength.

As described before, the present embodiment is designed such that the optoacoustic media 8 and 9 are both formed in rectangular parallelepiped shape. The shape of the optoacoustic media is not necessarily limited to such a shape. In the bottom line, the optoacoustic media should be formed in a shape which has incoming and outgoing surfaces perpendicular to the optical axis of the light signals transmitted therethrough. For example, it is possible to employ the cylindrical shape and the like.

Moreover, the present embodiment is capable of using any one of the transmitted light and diffracted light of the light signal output from the optoacoustic media 9.

[B] Embodiment 2

Figure 4:
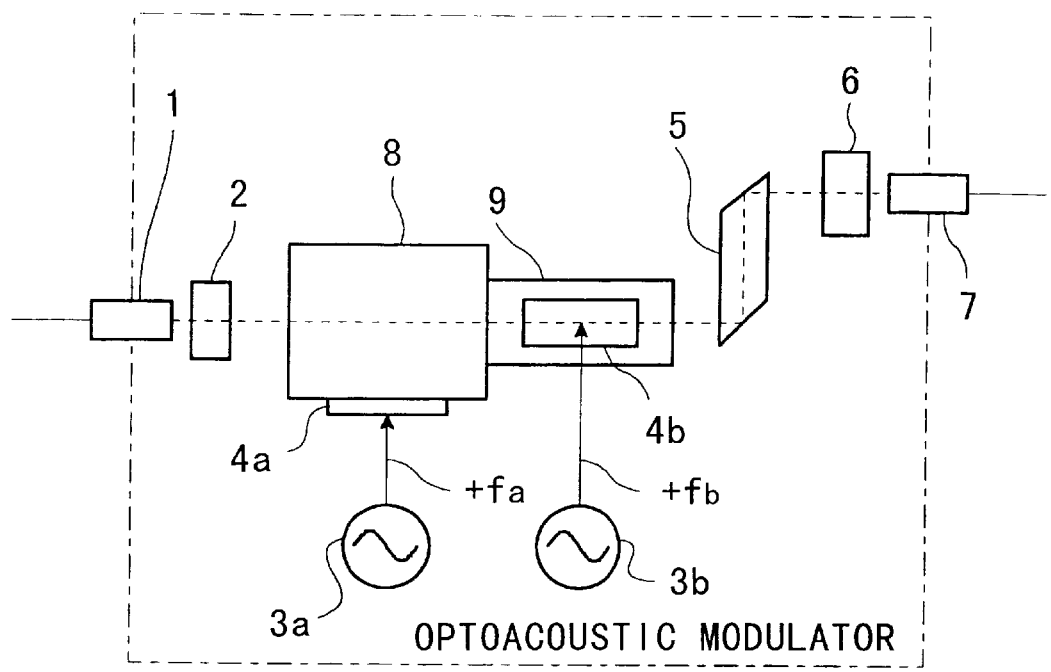
FIG. 4 is a block diagram showing a configuration of an optoacoustic modulator in accordance with embodiment 2 of the invention.

FIG. 4 shows a configuration of an optoacoustic modulator in accordance with embodiment 2 of the invention. In FIG. 4, parts identical to those shown in FIG. 1 and FIG. 2 will be designated by the same numerals; hence, the description thereof will be omitted according to needs.

As compared with the aforementioned optoacoustic modulator of FIG. 1, the optoacoustic modulator of FIG. 4 is characterized by providing two oscillators 3a and 3b instead of the foregoing oscillator 3.

In FIG. 4, the oscillator 3a outputs a modulation signal providing a frequency shift (or frequency transition) of "+fa". The modulation signal output from the oscillator 3a is supplied to the piezoelectric vibrator 4a.

The oscillator 3b outputs a modulation signal providing a frequency shift (or frequency transition) of "+fb". The modulation signal output from the oscillator 3b is supplied to the piezoelectric vibrator 4b.

Figure 5:
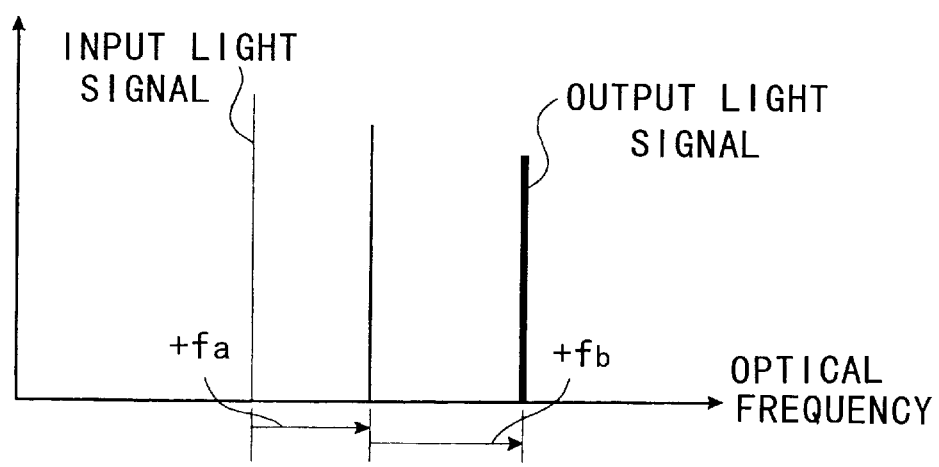
FIG. 5 is a graph showing a manner of transition in optical frequency of a light signal input to the optoacoustic modulator of FIG. 4.

FIG. 5 shows a manner of transition in optical frequency of the light signal input to the optoacoustic modulator of the present embodiment.

As shown in FIG. 5, the present embodiment applies the modulation signals, providing frequency shifts in a same direction in transition of the optical frequency, to the optoacoustic media 8 and 9 respectively. Thus, it is possible to increase an amount of transition in the optical frequency, which can be offered by a single optoacoustic modulator.

Incidentally, the present embodiment does not have variations in loss due to the PMD effect, so it is capable of reducing an amount of crosstalk.

[C] Embodiment 3

Figure 6:
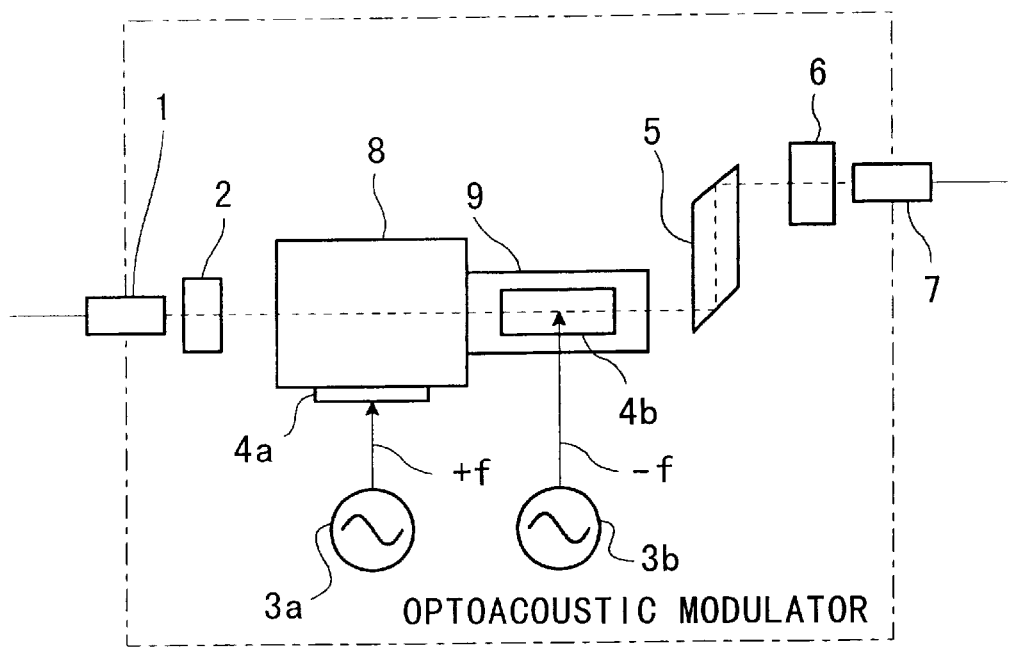
FIG. 6 is a block diagram showing a configuration of an optoacoustic modulator in accordance with embodiment 3 of the invention.

FIG. 6 shows a configuration of an optoacoustic modulator in accordance with embodiment 3 of the invention. In FIG. 6, parts identical to those shown in FIG. 1, FIG. 2 and FIG. 4 are designated by the same numerals; hence, the description thereof will be omitted according to needs.

In the present embodiment, as shown in FIG. 6, the oscillator 3a outputs a modulation signal providing a frequency shift of "+f", which is supplied to the piezoelectric vibrator 4a.

In addition, the oscillator 3b outputs a modulation signal providing a frequency shift of "−f", which is supplied to the piezoelectric vibrator 4b.

Figure 7:
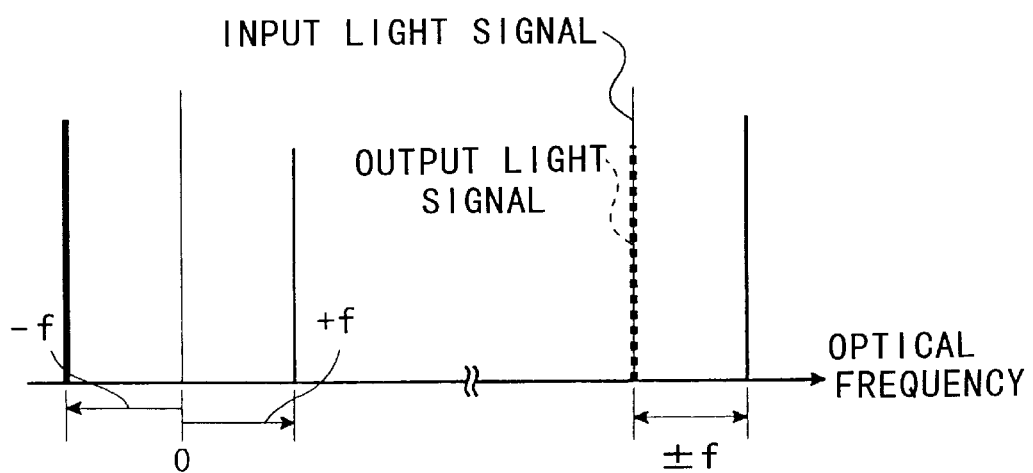
FIG. 7 is a graph showing a manner of transition in optical frequency of a light signal input to the optoacoustic modulator of FIG. 6.
Figure 8:
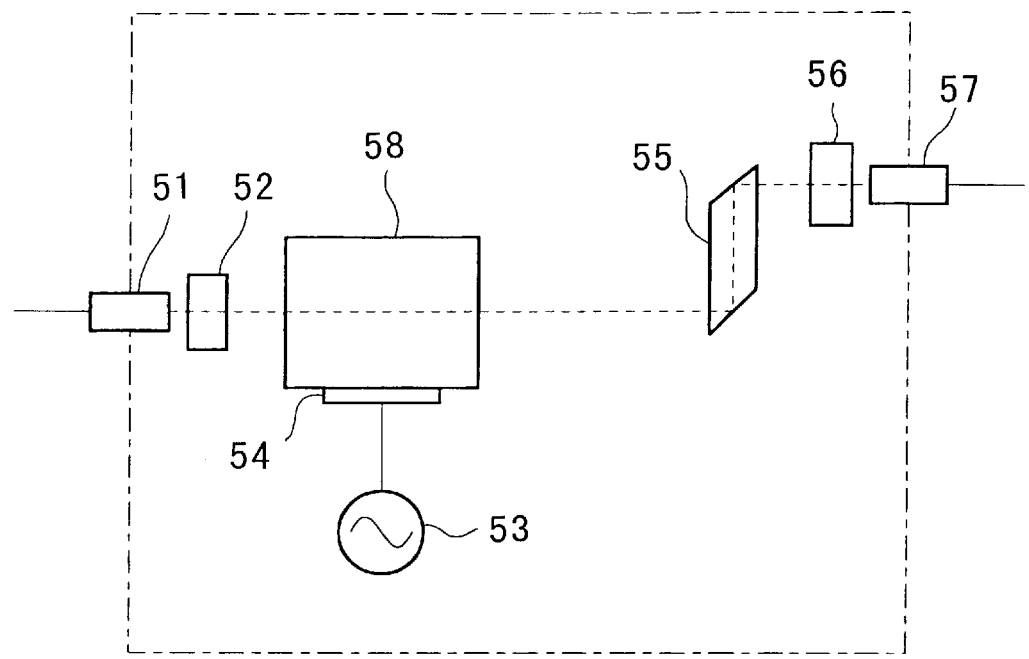
FIG. 8 is a block diagram showing an example of a configuration of the optoacoustic modulator.
Figure 9:
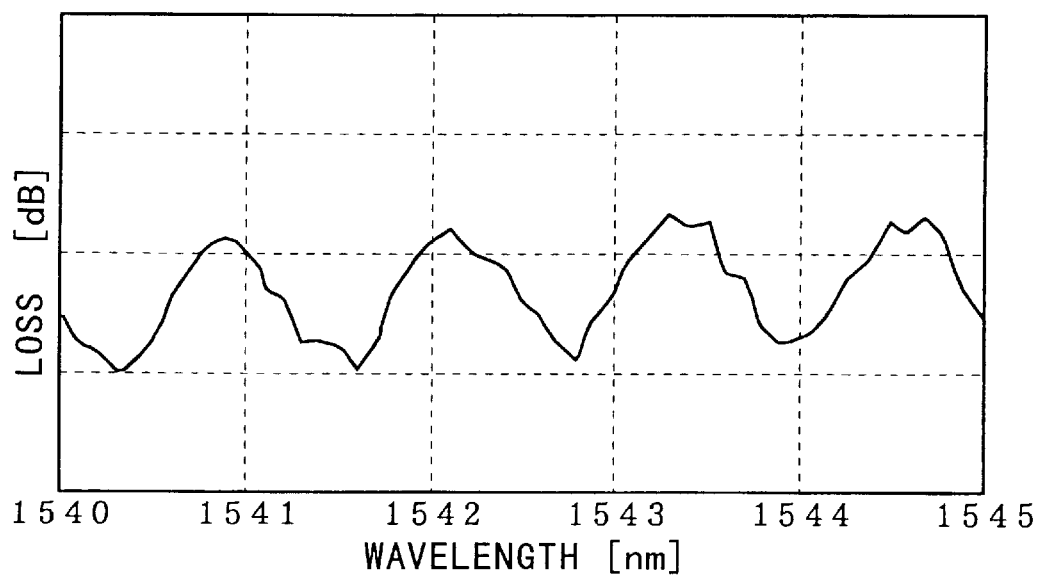
FIG. 9 is a graph showing an example of loss-wavelength dependency characteristic that is presented by the optoacoustic modulator of FIG. 8.

FIG. 7 shows a manner of transition in optical frequency of the light signal input to the optoacoustic modulator of the present embodiment.

As shown in FIG. 7, the present embodiment applies the modulation signals to the optoacoustic media 8 and 9 respectively, wherein the modulation signals both have a same amount of frequency shift, but they are reverse from each other in directions to apply the frequency shifts. Using such "reverse" frequency shifts, it is possible to cancel a transition of optical frequency that occurs due to optoacoustic effects.

Incidentally, the present embodiment does not have variations in loss due to the PMD effect, so it is possible to reduce an amount of crosstalk.

[D] Embodiment 4

As further modifications (or applications) of the aforementioned embodiments, it is possible to propose another configuration for the optoacoustic modulator in which modulation signals respectively supplied to the optoacoustic media 8 and 9 are adjusted independently. According to such a configuration of the optoacoustic modulator, there are provided combinations in directions of transition of optical frequencies and amounts of frequency transition, which are provided by adjusting the modulation signals independently. Based on such combinations, the optoacoustic modulator is capable of providing a light signal output which has an arbitrary amount of frequency transition applied in an arbitrary direction in transition of the optical frequency.

Incidentally, the present embodiment does not have variations in loss due to the PMD effect, so it is possible to reduce an amount of crosstalk.

As this invention may be embodied in several forms without departing from the spirit of essential characteristics thereof, the aforementioned embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An optoacoustic modulator comprising:

first optoacoustic media on which a light signal is incident;

second optoacoustic media, which is arranged on an optical axis of the light signal and which is made of a same material of the first optoacoustic media and is configured using a same optical length of the first optoacoustic media, wherein crystal orientation of the second optoacoustic media differs from crystal orientation of the first optoacoustic media with an angle of inclination of 90°, so that the light signal transmitted through the first optoacoustic media is incident on the second optoacoustic media;

a first vibrator being attached to a first surface of the first optoacoustic media, which is placed in parallel with the optical axis of the light signal;

first oscillation means for supplying a first modulation signal to the first vibrator;

a second vibrator being attached to a second surface of the second optoacoustic media, which is placed in parallel with the optical axis of the light signal and which is directed perpendicular to the first surface of the first optoacoustic media to which the first vibrator is attached; and second oscillation means for supplying a second modulation signal to the second vibrator, wherein a first direction in transition of optical frequency that occurs when the light signal is transmitted through the first optoacoustic media on the basis of the first modulation signal is identical to a second direction in transition of optical frequency that occurs when the light signal is transmitted through the second optoacoustic media on the basis of the second modulation signal.

2. An optoacoustic modulator comprising:

first optoacoustic media on which a light signal is incident;

second optoacoustic media, which is arranged on an optical axis of the light signal and which is made of a same material of the first optoacoustic media and is configured using a same optical length of the first optoacoustic media, wherein crystal orientation of the second optoacoustic media differs from crystal orientation of the first optoacoustic media with an angle of inclination of 90°, so that the light signal transmitted through the first optoacoustic media is incident on the second optoacoustic media;

a first vibrator being attached to a first surface of the first optoacoustic media, which is placed in parallel with the optical axis of the light signal;

first oscillation means for supplying a first modulation signal to the first vibrator;

a second vibrator being attached to a second surface of the second optoacoustic media, which is placed in parallel with the optical axis of the light signal and which is directed perpendicular to the first surface of the first optoacoustic media to which the first vibrator is attached; and second oscillation means for supplying a second modulation signal to the second vibrator, wherein a first amount of transition of optical frequency that occurs in a first direction when the light signal is transmitted through the first optoacoustic media on the basis of the first modulation signal is identical to a second amount of transition of optical frequency that occurs in a second direction when the light signal is transmitted through the second optoacoustic media on the basis of the second modulation signal, and wherein the first direction is reverse to the second direction.

3. An optoacoustic modulator comprising:

first optoacoustic media on which a light signal is incident;

second optoacoustic media, which is arranged on an optical axis of the light signal and which is made of a same material of the first optoacoustic media and is configured using a same optical length of the first optoacoustic media, wherein crystal orientation of the second optoacoustic media differs from crystal orientation of the first optoacoustic media with an angle of inclination of 90°, so that the light signal transmitted through the first optoacoustic media is incident on the second optoacoustic media;

a first vibrator being attached to a first surface of the first optoacoustic media, which is placed in parallel with the optical axis of the light signal;

first oscillation means for supplying a first modulation signal to the first vibrator;

a second vibrator being attached to a second surface of the second optoacoustic media, which is placed in parallel with the optical axis of the light signal and which is directed perpendicular to the first surface of the first optoacoustic media to which the first vibrator is attached; and second oscillation means for supplying a second modulation signal to the second vibrator, wherein the first oscillation means outputs the first modulation signal, which is capable of arbitrarily determining a first direction and a first amount of transition of optical frequency that occurs in the first direction when the light signal is transmitted through the first optoacoustic media, while the second oscillation means outputs the second modulation signal, which is capable of arbitrarily determining a second direction and a second amount of transition of optical frequency that occurs in the second direction when the light signal is transmitted through the second optoacoustic media.

* * * * *